H. C. GOODRICH.
Hemmers and other Sewing-Machine Attachments.
No. 148,047. Patented March 3, 1874.

Witnesses:
E. A. West.
O. W. Bond.

Harry C. Goodrich
Inventor.

AM. PHOTO-LITHOGRAPHIC Co. N.Y. (OSBORNE'S PROCESS.)

UNITED STATES PATENT OFFICE.

HARRY C. GOODRICH, OF CHICAGO, ILLINOIS.

IMPROVEMENT IN HEMMERS AND OTHER SEWING-MACHINE ATTACHMENTS.

Specification forming part of Letters Patent No. 148,047, dated March 3, 1874; application filed January 15, 1874.

CASE A.

*To all whom it may concern:*

Be it known that I, HARRY C. GOODRICH, of the city of Chicago, in the county of Cook and State of Illinois, have invented new and useful Improvements in Hemmers and other Attachments for Sewing-Machines, of which the following is a full description, reference being had to the accompanying drawings, in which—

Figure 1:
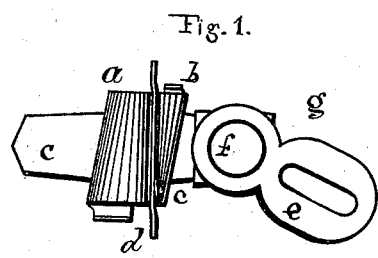
Figure 2:
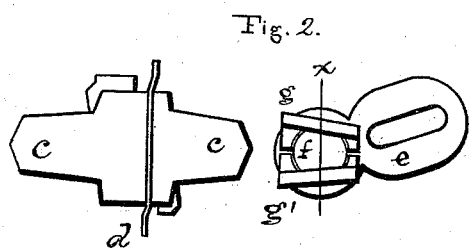
Figure 3:
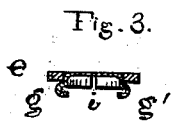
Figure 4:
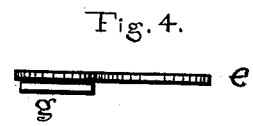
Figure 5:
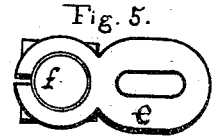
Figure 6:
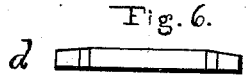

Figure 1 is a plan view; Fig. 2, an underside view of the parts shown in Fig. 1, separated from each other; Fig. 3, a cross-section on line $x$ of Fig. 2; Fig. 4, a side view of the holder; Fig. 5, a variation; and Fig. 6, a side view of the cloth-gage.

My invention consists in providing a hemmer or other attachment with a tapering tongue; in providing an adjustable holder with tapering grooves to receive said tongue; in providing a holder with a loosely-connected stud, having tapering grooves, so that the tapering tongue of the hemmer will operate as a key to hold the stud in the holder; in providing a hemmer with a cloth-gage; and in the several combinations hereinafter claimed.

In the drawing, $a$ $b$ represent two hemmers of different sizes, each provided with a tapering tongue, $c$, together forming a double hemmer. Between the two hemmers is a cloth-gage, $d$. $e$ is the holder, having a slot, as usual, to receive the set-screw, and a hole at one end, into which the stud $f$ is inserted, and loosely secured. The under side of this stud is provided with two tapering grooves, $g$ $g'$, adapted to receive the tapering tongue $c$. The stud and grooves may be made conveniently from a single piece of sheet metal. The two sides of the stud and the connecting sheet metal beneath are cut, as represented in Fig. 2, and at $i$, Fig. 3, leaving the top of the stud only entire, so that when the tongue $c$ is inserted into the grooves it will spring the two disconnected parts from each other, and thus hold the stud $f$ firmly in the holder.

In manufacturing, the stud $f$ is made slightly smaller than the hole in the holder, and having been put into place, and being properly supported beneath, can, by a slight blow on the top, be distended so that it cannot escape, and yet it will be loosely connected with the holder.

I have only represented a double hemmer, but a single hemmer or other attachment can be provided with a tapering tongue, and used with the tapering grooves.

In use, the tongue of the hemmer or other attachment is to be loosely inserted into the tapering grooves $g$ $g'$, and the hemmer and the holder are to be placed upon the machine. The holder $e$, being loose upon the stud $f$, can be adjusted as may be necessary to bring the slot over the hole in the bed-plate which receives the set-screw. Then by pressing the tongue into the grooves it will operate as a key, expanding the two parts of the stud, so that it cannot be readily moved in the holder, and by means of the proper set-screw the device can be secured to the machine.

The tongue and the grooves being tapering, the hemmer will be held in the holder with sufficient tightness, without the use of any latch, key, or other device.

A series of hemmers or other attachments, each provided with a tapering tongue, can be used with a single holding device, and the tongues and grooves being tapering, they will accommodate themselves to each other, even should there be some differences in the construction of the several hemmers or attachments.

The form represented in Fig. 5 may be adopted instead of that already described, in which the end of the holder, into which the stud passes, is cut, as shown at $k$, and the sides of the stud and the connecting-plate are not cut, as before described. When so constructed, the stud can be permanently connected with the holder; but instead of being keyed in place in use, it will be held in any position in which it may be placed, simply by friction only.

This variation may be used, but I do not regard it as good as the other form.

What I claim as new is as follows:

The stud $f$, made expansible by means of the slit $i$, and provided with the tapering grooves $g$ $g'$, and holding-plate $e$, substantially as and for the purposes specified.

H. C. GOODRICH.

Witnesses:
    E. A. WEST,
    O. W. BOND.